United States Patent
Odaohhara et al.

(10) Patent No.: US 6,744,234 B2
(45) Date of Patent: Jun. 1, 2004

(54) PRELIMINARY CHARGING STATE APPARATUS, PROGRAM AND METHOD

(75) Inventors: Shigefumi Odaohhara, Yamato (JP); Masaki Kobayashi, Tokyo (JP); Takaaki Aoki, Ebina (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/227,323

(22) Filed: Aug. 23, 2002

(65) Prior Publication Data

US 2003/0057922 A1 Mar. 27, 2003

(30) Foreign Application Priority Data

Sep. 19, 2001 (JP) ........................................ 2001-284487

(51) Int. Cl.[7] .................................................. H02J 7/00
(52) U.S. Cl. ..................................................... 320/100
(58) Field of Search ................................. 320/128, 132, 320/DIG. 18, DIG. 21; 324/426–433; 340/635, 636; 713/300, 340

(56) References Cited

U.S. PATENT DOCUMENTS 5,352,967 A * 10/1994 Nutz et al.
6,456,041 B1 * 9/2002 Terada et al.

OTHER PUBLICATIONS

English translation of Japanese Application, Publication No. HEI 8–51248, published Feb. 20, 1996 by Japanese Patent Office, title "Internal Resonance Type Planar–Light–Emitting SHG Laser", by Kenji Ito, pp. 1–10.

* cited by examiner

Primary Examiner—Pia Tibbits
(74) Attorney, Agent, or Firm—J. Bruce Schelkopf

(57) ABSTRACT

The present invention provides an electrical apparatus, program and method for a user to display a preliminary charging state in a battery. In one aspect, the present invention provides an electrical apparatus that is capable of receiving a battery for supplying electric power to a main unit by discharging after charging, comprising preliminary charge judging means for judging whether or not the battery is in a preliminary charging state that is a recovery from overdischarge, and display means for displaying an indication of preliminary charging if the preliminary charge judging means judges that the battery is in the preliminary charging state.

17 Claims, 4 Drawing Sheets

PRELIMINARY CHARGING STATE APPARATUS, PROGRAM AND METHOD

BACKGROUND OF THE INVENTION

1. Field of the Invention

The present invention relates to an electrical apparatus having a battery usable by repeating the charge and discharge function, and more particularly to an electrical apparatus in relation to a preliminary charging state.

2. Description of Related Art

For an information terminal equipment device, often represented by a notebook type personal computer (hereinafter referred to as a notebook PC), or various kinds of electrical apparatus such as a PDA (Personal Digital Assistant), an MD (Mini Disc) device, and/or a video camera, electric power is typically supplied directly from the commercial power supply, or from a rechargeable battery (battery, storage battery, secondary battery) that can be used many times over by simply repeating the charging and discharging of the battery. Such a battery, by way of example, may include a nickel hydride battery or a nickel cadmium battery (NiCd battery) that has relatively large capacity, and which is also typically inexpensive. In a further example, a lithium ion battery (having a higher energy density per unit weight than the nickel cadmium battery) and a lithium polymer battery, using the solid polymer without liquid electrolyte, are provided.

For this chargeable and dischargeable battery, an intelligent battery having a CPU inside a battery pack that is mounted on the electrical apparatus is widely employed. This intelligent battery may conform with the SBS (Smart Battery System), and communicate with a controller on the main unit side, employing an SBS protocol.

As is known, these batteries store electricity by the use of the chemical reaction, but involve a reversible range and an irreversible range as a result of the chemical reaction involved in the process of charging and discharging. If the discharge is made to a predetermined extent, the battery is restored to an originally charged state by supplying electricity from the outside. However, if the battery is discharged beyond a full discharge (discharge up to 100% of the rated capacity of battery), the battery becomes a so-called over-discharge to consume an electromotive force produced by a reaction other than the intrinsically reversible chemical reaction, resulting in an abnormally charged state even by charging.

In recovering the over-discharged battery, it is typically required to make the preliminary charge (trickle charge, pre-charge) of charging the battery at a low current before a quick charge so as not to damage the battery. If a fixed voltage value is reached in this preliminary charge, the quick charge is effected to make ordinary charge. This preliminary charge may be needed for about two hours depending on the extent of over-discharge of the battery.

However, in a conventional system, the preliminary charge and the quick charge are similarly handled. For even if a predetermined power supply meter displays that the charging is running, the user does not know that the preliminary charge is being performed. At such a time, an indication of a capacity of 0% is often displayed continuously during the two hours of preliminary charging, usually in a display. In such a case, the user may unknowingly exchange the normal battery by mistakenly assuming that a malfunction of not charging the battery has occurred. Furthermore, concerns also arise that as a result of the unobvious activity, a user may be inclined to make what actually is an otherwise unnecessary inquiry to a help center.

Moreover, in the SBS protocol, as cited above, though the data of displaying charging current value exists, when the current value is smaller, there is no interface indicating whether the current value is small immediately before the completion of charging, or the current value is small because of the preliminary charge that is a recovery from the over-discharge. Accordingly, it is not possible for the conventional system to distinguish between the preliminary charge and the quick charge even in the preliminary charging state at a stage of enabling the communication between the battery and the system.

SUMMARY OF THE INVENTION

Accordingly, there is a need for a preliminary charging state apparatus, program and method.

The present invention has been achieved to solve the above-mentioned technical problems, and it is an object of the invention to clearly identify the preliminary charging state in a battery.

Also, it is another object of the invention to provide an electrical apparatus having a battery in which the preliminary charging state is informed to the user.

To attain the above objects, the present invention provides an electrical apparatus that is capable of receiving a battery for supplying electric power to a main unit by discharging after charging, comprising preliminary charge judging means for judging whether or not the battery is in a preliminary charging state that is a recovery from over-discharge, and display means for displaying an indication of preliminary charging if the preliminary charge judging means judges that the battery is in the preliminary charging state.

The display means displays the remaining charging time including the time required for the preliminary charge and the time required for the quick charge that is made later, whereby it is possible to solve the problem that the user mistakes the fault despite the preliminary charging. Displaying the remaining charging time "including" the time required for the preliminary charge and the time required for the quick charge involves displaying one remaining charging time by adding both the charging times, displaying both at the same time or switching both.

The electrical apparatus to which the invention is applied comprises a main unit that consumes the electric power, and a battery for supplying electric power to the main unit by discharging after charging, wherein the main unit judges that the battery is in the preliminary charging state that is a recovery from over-discharge if a predetermined communication with the battery is disabled after confirming that the battery is connected while being charged, and displays the judged result.

Further, this invention provides a computer that is connectable to a battery for charging and discharging, in which an electric power is supplied from the battery connected to a system main unit. At this time, the system main unit comprises a battery connection confirmation terminal for confirming that the battery is connected, a controller that judges that the battery is in a preliminary charging state if a predetermined communication with the battery is disabled after acquiring the information indicating that the battery is connected from the battery connection confirmation terminal, and a display for displaying that the battery is in preliminary charging state if the controller judges that the battery is in the preliminary charging state.

From another aspect, a computer to which the invention is applied comprises preliminary charge judging means for judging whether or not the battery is in a preliminary charging state that is a recovery from over-discharge, and display means for displaying an indication of the preliminary charging if the preliminary charge judging means judges that the battery is in the preliminary charging state.

The preliminary charge judging means judges the preliminary charging, on the basis of the information acquired via a communication line from a CPU provided in the battery, if the remaining capacity of the battery is less than a predetermined amount (e.g., remaining capacity 10%) and electric current flowing through the battery is in a predetermined range (e.g., range from 0A to 0.5A), whereby it is possible to grasp the preliminary charging on the system side in the form in which a communication with the CPU is enabled even with over-discharge.

Further, the invention can be grasped as a preliminary charging state display method. That is, the preliminary charging state display method to which the invention is applied is used with an electrical apparatus that is connectable to a battery for discharging after charging, in which electric power is supplied from the battery to a main unit, the method comprising judging whether or not the battery is in a preliminary charging state that is a recovery from over-discharge, and displaying an indication of the preliminary charging state if the battery is judged to be in the preliminary charging state.

This invention can be designated as a utility program being executed on a computer capable of mounting a battery for supplying electric power by charging and discharging. That is, this invention can be grasped as the utility program for use with the computer connectable to the battery for discharging after charging, in which electric power is supplied from the battery to a main unit, the utility program comprising a function of acquiring the information indicating that the battery is in preliminary charging that is a recovery from over-discharge, and a function of displaying that the battery is in preliminary charging state if the information indicating that the battery is in preliminary charging is acquired.

This utility program suffices to implement the above functions on the computer. A method of providing this program may involve reading the program stored in the storage medium such as a CD-ROM in a reader section for the storage medium such as a CD-ROM drive. Also, the program may be installed from the program transmission device via a network such as the Internet into the computer.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
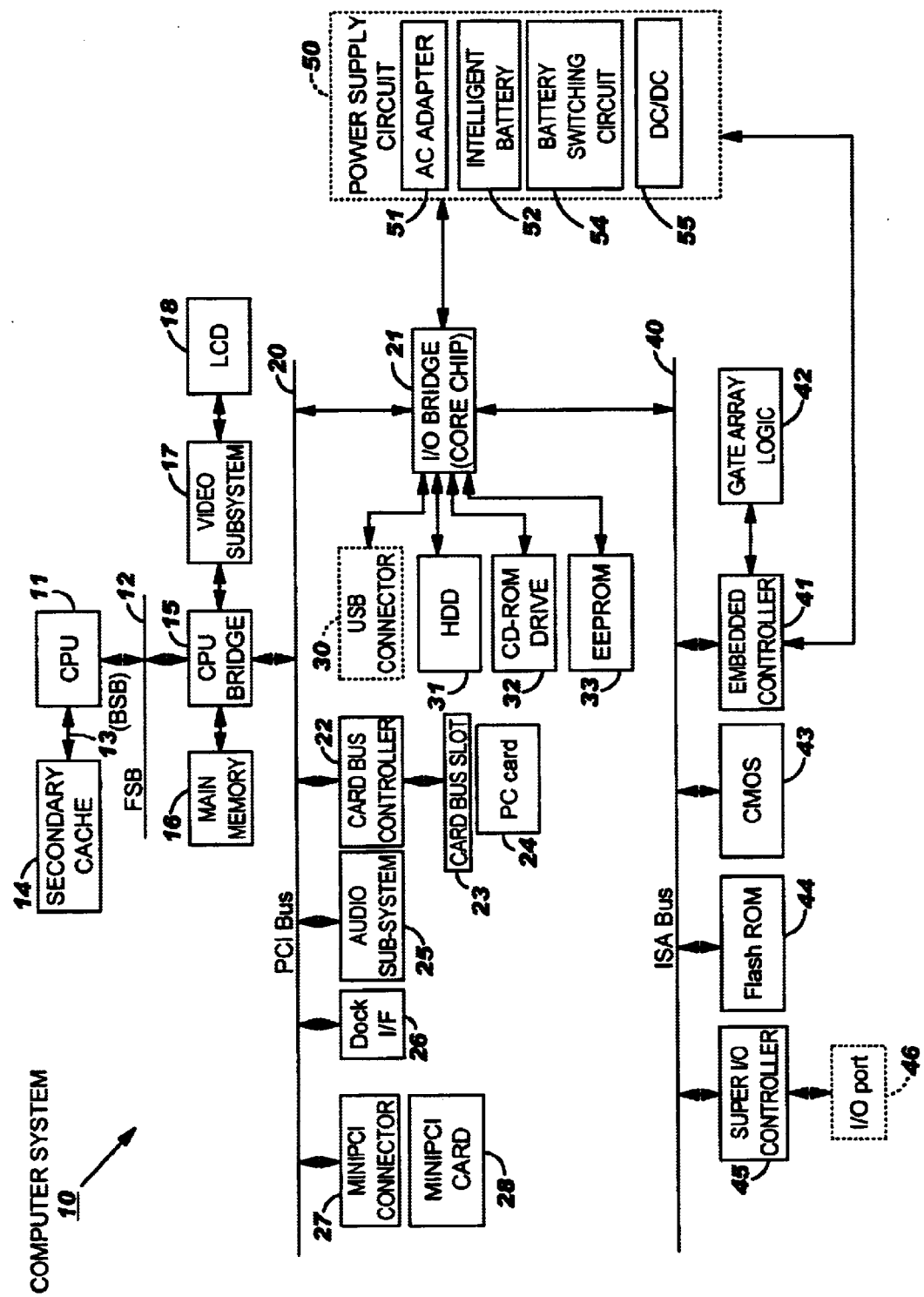
FIG. 1 is a block diagram showing a hardware configuration of a computer system 10 according to an embodiment of the invention.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings.

FIG. 1 is a block diagram showing the hardware configuration of a computer system 10 according to an embodiment of the invention. A computer with this computer system 10 is in conformance with the OADG (Open Architecture Developer's Group) specification, for example, and is constituted as a notebook PC (notebook type personal computer) with a predetermined OS (Operating System).

In the computer system 10 as shown in FIG. 1, a CPU 11 operates as a brain of the entire computer system 10, and executes the utility program and other programs under the control of the OS. The CPU 11 is interconnected to various components via three stages of buses, including an FSB (Front Side Bus) 12 as a system bus, a PCI (Peripheral Component Interconnect) bus 20 as a high speed I/O device bus, and an ISA (Industry Standard Architecture) bus 40 as a low speed I/O device bus. This CPU 11 effects the faster processing by storing a program code or the data in a cache memory. In recent years, an SRAM of about 128K bytes is accumulated as a primary cache inside the CPU 11, but a secondary cache 14 of about 512K to 2M bytes is arranged via a BSB (Back Side Bus) 13 as a dedicated bus to supplement insufficient capacity. The secondary cache 14 may be connected to the FSB 12 by omitting the BSB 13 to avoid the package with many terminals, and reduce the costs.

The FSB 12 and the PCI bus 20 are linked via a CPU bridge (host-PCI bridge) 15 referred to as a memory/PCI chip. This CPU bridge 15 has a memory control function of controlling the access operation to a main memory 16 and comprises a data buffer to absorb a difference in data transfer rate between the FBS 12 and the PCI bus 20. The main memory 16 is a writable memory employed as an area for reading an execution program for the CPU 11 or a working area for writing the processed data of the execution program. For example, the main memory 16 is composed of a plurality of DRAM chips, and mounts 64 MB as standard and can be extended up to 320 MB. The execution programs include the OS or various sorts of drivers for driving the hardware of peripheral devices, application programs intended for specific transactions, and the firmware such as a BIOS (Basic Input/Output System) stored in a flash ROM 44 as will be described later.

A video sub-system 17 implements the functions associated with the video, and contains a video controller. This video controller processes a drawing instruction from the CPU 11, and writes the processed drawing information into a video memory, as well as reading the drawing information from the video memory to output the drawing data to a liquid crystal display (LCD) 18. The liquid crystal display (LCD) 18 displays an indication of preliminary charging (hereinafter described) by a utility program executed in the CPU 11.

The PCI bus 20 is capable of making the relatively fast data transfer, and is standardized as the data bus width of 32 bits or 64 bits, the maximum operation frequency of 33 MHz or 66 MHz, and the maximum data transfer rate of 132 MB/sec or 528 MB/sec. This PCI bus 20 is connected to an I/O bridge 21, a card bus controller 22, an audio sub-system 25, a docking station interface (Dock, I/F) 26, and a mini PCI connector 27.

The card bus controller 22 is a dedicated controller for connecting a bus signal of the PCI bus 20 directly to an interface connector (card bus) of a card bus slot 23, into which a PC card 24 can be loaded. The docking station interface 26 is a hardware for connecting a docking station (not shown) that is a function extended device of the computer system 10. If a notebook PC is set in the docking station, various sorts of hardware elements connected to the internal bus of the docking station are connected via the docking station interface 26 to the PCI bus 20. A mini PCI (miniPCI) card 28 is connected to the mini PCI connector 27.

The I/O bridge 21 has a bridge function between the PCI bus 20 and the ISA bus 40. Also, it comprises a DMA controller function, a programmable interrupt controller (PIC) function, a programmable interval timer (PIT) function, an IDE (Integrated Device Electronics) interface function, a USB (Universal Serial Bus) function, and an SMB (System Management Bus) interface function, and contains a real time clock (RTC).

The DMA controller function performs the data transfer between the peripheral device such as an FDD and the main memory 16 without intervention of the CPU 11. The PIC function runs a predetermined program (interrupt handler) in response to an interrupt request (IRQ) from the peripheral device. The PIT function generates a timer signal at a certain period. Also, the interface realized by the IDE interface function has an IDE hard disk drive (HDD) 31 connected, and a CD-ROM drive 32 connected in ATAPI (AT Attachment Packet Interface). Instead of the CD-ROM drive 32, other types of IDE device such as a DVD (Digital Versatile Disc) drive may be connected. An external storage device such as HDD 31 or CD-ROM drive 32 is accommodated in a storage place referred to as a "media bay" or a "device bay" within the notebook PC, for example. These external storage devices mounted as the standard may be attached exchangeably or exclusively with other devices such as an FDD or battery pack (intelligent battery).

Also, a USB port is provided in the I/O bridge 21, and connected to a USB connector 30 provided on a wall face of the notebook PC, for example. Further, the I/O bridge 21 is connected via an SM bus to an EEPROM 33. The EEPROM 33 carries the information, including a password registered by the user, a supervisor password, and the product serial number, and is non-volatile and electrically rewriteable.

Further, the I/O bridge 21 is connected to a power supply circuit 50. The power supply circuit 50 comprises an AC adapter 51 being connected to the commercial power supply of AC 100V, for example, for making the AC/DC conversion, an intelligent battery 52 as a battery (secondary battery), a battery switching circuit 54 for charging this intelligent battery 52 and switching the power supply path from the AC adapter 51 and the intelligent battery 52, and a DC/DC converter (DC/DC) 55 for generating a DC constant voltage such as +15V, +5V or +3.3V for use in the computer system 10.

On the other hand, inside a core chip making up the I/O bridge 21 are provided an internal register for managing the power supply condition of the computer system 10, and a logic (state machine) for managing the power supply condition of the computer system 10 including the operation of this internal register. This logic sends or receives various sorts of signal to or from the power supply circuit 50, and recognizes the actual feeding state from the circuit 50 to the computer system 10 upon sending or receiving this signal. The power supply circuit 50 controls the power supply to the computer system 10 in accordance with an instruction from the logic.

The ISA bus 40 has a lower data transfer rate than the PCI bus 20 (e.g., the bus width of 16 bits and the maximum data transfer rate of 4MB/sec). An embedded controller 41 connected to a gate array logic 42, a CMOS 43, a flash ROM 44, and a Super I/O controller 45 are connected to this ISA bus 40. Further, the ISA bus 40 is also employed to connect the peripheral devices operating at relatively low rate, such as a keyboard/mouse controller. The Super I/O controller 45 is connected to an I/O port 46, and controls the driving of FDD, the parallel data input/output (PIO) via a parallel port, and the serial data input/output (SIO) via a serial port.

The embedded controller 41 controls the keyboard, not shown, and is connected to the power supply circuit 50 to have a part of the power supply management function with the gate array logic 42 under the control of a built-in Power Management Controller (PMC).

A power supply system that is also a feature of this embodiment will be described below.

Figure 2:
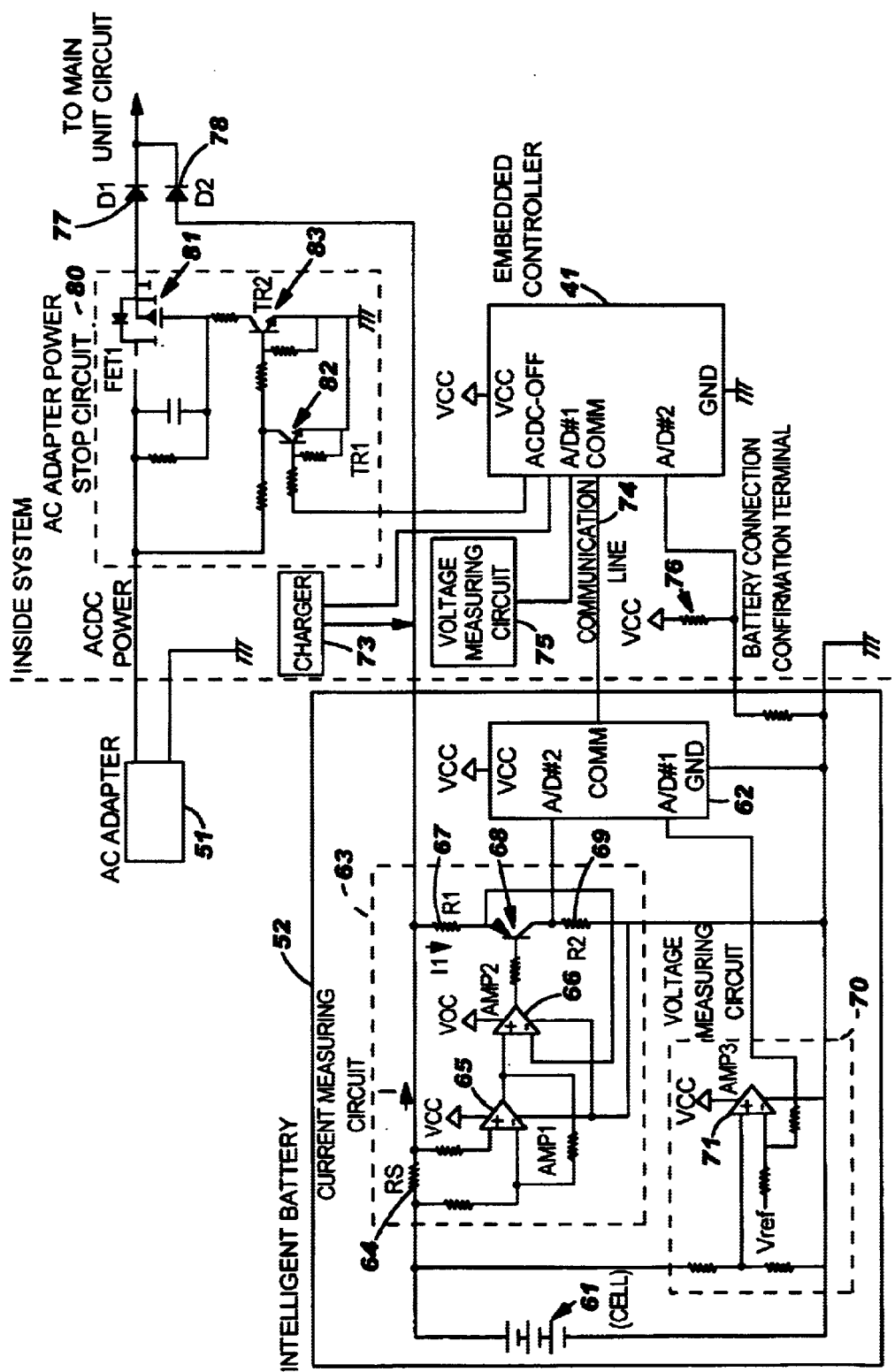
FIG. 2 is a block diagram showing a circuit configuration of this power supply system.

FIG. 2 is a block diagram showing the circuit configuration of this power supply system. This power supply system consists of the power supply circuit 50 as shown in FIG. 1, the embedded controller 41 and an AC adapter power stop circuit 80.

The power supply system as shown in FIG. 2 comprises the AC adapter 51 that is the power supply device connected to the commercial power supply, and the intelligent battery 52 that is the secondary battery (battery, storage battery) composed of a lithium ion battery to be used through the repetitive operation of charging and discharging, and in conformance with the SBS (Smart Battery System).

The electric power from this AC adapter 51 and the intelligent battery 52 is output via the DC/DC converter 55 as shown in FIG. 1 to a main unit circuit of the computer system 10.

Also, the power supply system as shown in FIG. 2 comprises, on the main unit system side, the embedded controller 41 for communicating via a communication line 74 with the intelligent battery 52, a charger 73 for charging the intelligent battery 52, a voltage measuring circuit 75 for measuring the voltage at the time of over-discharge and notifying it to the embedded controller 41, and a battery connection confirmation terminal 76 for confirming whether or not the intelligent battery 52 is connected at the time of over-discharge. Moreover, it comprises the AC adapter power stop circuit 80 for refreshing the intelligent battery 52, and a first diode (D1) 77 and a second diode (D2) 78 for rectifying the power supplied from the AC adapter 51 and the power supplied from the intelligent battery 52 to avoid conflict.

The AC adapter 51 as the power supply device is typically provided outside the electrical apparatus such as the notebook PC containing the computer system 10 that is a main unit (internal) system, but may be provided inside a housing for the electrical apparatus. This main unit system may be provided with an inlet capable of attaching or detaching a cable connector, for example. This inlet is configured so as to detachably accept a connector from the cable connected to the AC adapter 51, if the AC adapter 51 is provided outside, or a connector directly connected to the commercial power supply, if the AC adapter 51 is provided inside the main unit system. The intelligent battery 52 is mounted on or dismounted from the main unit system as a battery pack, or may be provided within the housing of the electrical apparatus.

The internal constitution of the intelligent battery 52 that is a battery pack will be described below. As shown in FIG. 2, the intelligent battery 52 comprises a cell 61 composed of a plurality of unit cells that are charged and discharged, a CPU 62 for controlling the intelligent battery 52 and communicating via the communication line 74 with the embedded controller 41, a current measuring circuit 63 for measuring the current value charged into or discharged from the intelligent battery 52, and a voltage measuring circuit 70 for measuring the voltage of the cell 61. The cell 61 is a lithium ion combination battery composed of six cells, two cells in parallel and three cells in series (1.8 Ah/cell), for example.

The CPU 62 mounted inside the intelligent battery 52 makes the A/D (Analog to Digital) conversion of an analog signal that is the measured result entered from the current measuring circuit 63 and the voltage measuring circuit 70, and grasps the information regarding the battery, such as the capacity of battery. The grasped information regarding the battery is sent via the communication line 74 that is a communication path to the embedded controller 41 on the system side in accordance with the SBS protocol, for example.

The current measuring circuit 63 firstly generates a potential difference of voltage (IR) across a resistor (RS) 64 owing to a current I flowing from the cell 61. This voltage is differentially amplified by an operational amplifier (AMP1) 65. Also, a current I that is proportional to an output voltage of the operational amplifier (AMP1) 65 flows through the resistor (R1) 67 by means of an operational amplifier (AMP2) 66 and a transistor 68. Finally, a current I of the intelligent battery 52 can be converted into the voltage (11R2) developed in a resistor (R2) 69. This voltage (11R2) is output to A/D#2 port, and A/D converted by the Cpu 62.

Also, the voltage measuring circuit 70 measures a voltage of the intelligent battery 52. Specifically, a voltage of the cell 61 in the intelligent battery 52 is differentially amplified by an operational amplifier (AMP3) 71, transformed into a lower voltage once, passed to A/D#1 port of the CPU 62, and A/D converted by the CPU 62.

Next, the AC adapter power stop circuit 80 will be described below.

This AC adapter power stop circuit 80 has a function of stopping the power supply from the AC adapter 51. In the computer system 10 that is the main unit system, the first diode 77 and the second diode 78 are provided to supply electric power from the AC adapter 51 or the intelligent battery 52 as the secondary battery having a higher voltage value to the main unit circuit. In the case where the AC adapter 51 is connected, electric power is normally supplied from the AC adapter 51 via the first diode 77 to the main unit circuit, because the voltage of the AC adapter 51 is higher than the voltage of the intelligent battery 52.

Herein, when a memory effect arises in the intelligent battery 52 as the secondary battery, the supply of electric power from the AC adapter 51 connected is stopped by the AC adapter power stop circuit 80, enabling the intelligent battery 52 to make the complete discharge. That is, when it is desired to perform the intelligent battery 52 as the secondary battery to make the complete discharge, a High signal from the embedded controller 41 is supplied to the AC adapter power stop circuit 80. The first transistor (TR1) 82 of the AC adapter power stop circuit 80 receives the High signal and is turned on. If this first transistor 82 is turned on, the second transistor (TR2) 83 is turned off, so that an FET (FET1) 81 is turned off. Thereby, the power supply from the AC adapter 51 is stopped to shut off the power supply to the first diode 77, whereby electric power can be supplied from the intelligent battery 52 via the second diode 78 to the main unit circuit.

The preliminary charge in this embodiment will be described below. The over discharged battery (intelligent battery 52) must be subjected to preliminary charge (trickle charge, pre-charge) with a small current, because quick charge may damage the battery. The embedded controller 41 controls the charger 73 to make the preliminary charge of the intelligent battery 52. That is, the preliminary charge can be said to be a recovery state from the over discharge. If a fixed voltage is reached with this preliminary charge, the embedded controller 41 controls the charger 73 to transfer to the normal quick charge for charging the intelligent battery 52. The preliminary charge has the following two modes.

First of all, in the first mode, the embedded controller 41 detects the connection of the battery (intelligent battery 52) due to a voltage of the battery connection confirmation terminal 76, but electric power is not supplied to the CPU 62 inside the intelligent battery 52 due to over discharge, whereby the CPU 62 and the embedded controller 41 can not be communicated with each other. In such a case, the embedded controller 41 uses the battery voltage measuring function with the voltage measuring circuit 75 provided inside the system to make the preliminary charge till the battery voltage reaches a specified voltage for starting the quick charge. That is, in the case where the connection of the intelligent battery 52 is detected, the communication with the intelligent battery 52 is not established, and/or the battery voltage is less than or equal to a specified voltage, the first mode is determined.

In the second mode, the over discharge has been effected, but the battery voltage may remain by some quantity to supply electric power to the CPU 62 of the intelligent battery 52. That is, since the CPU 62 of the intelligent battery 52 is operating, the CPU 62 and the embedded controller 41 can communicate with each other, but because the battery voltage is low, the CPU 62 requests the embedded controller 41 for a small charging current value. Using the SBS (Smart Battery System) protocol, the preliminary charge in the second mode can be recognized, when "Remaining Capacity ( )<10%" and "0A<Average Current ( )<0.5A" is satisfied, for example.

Figure 3:
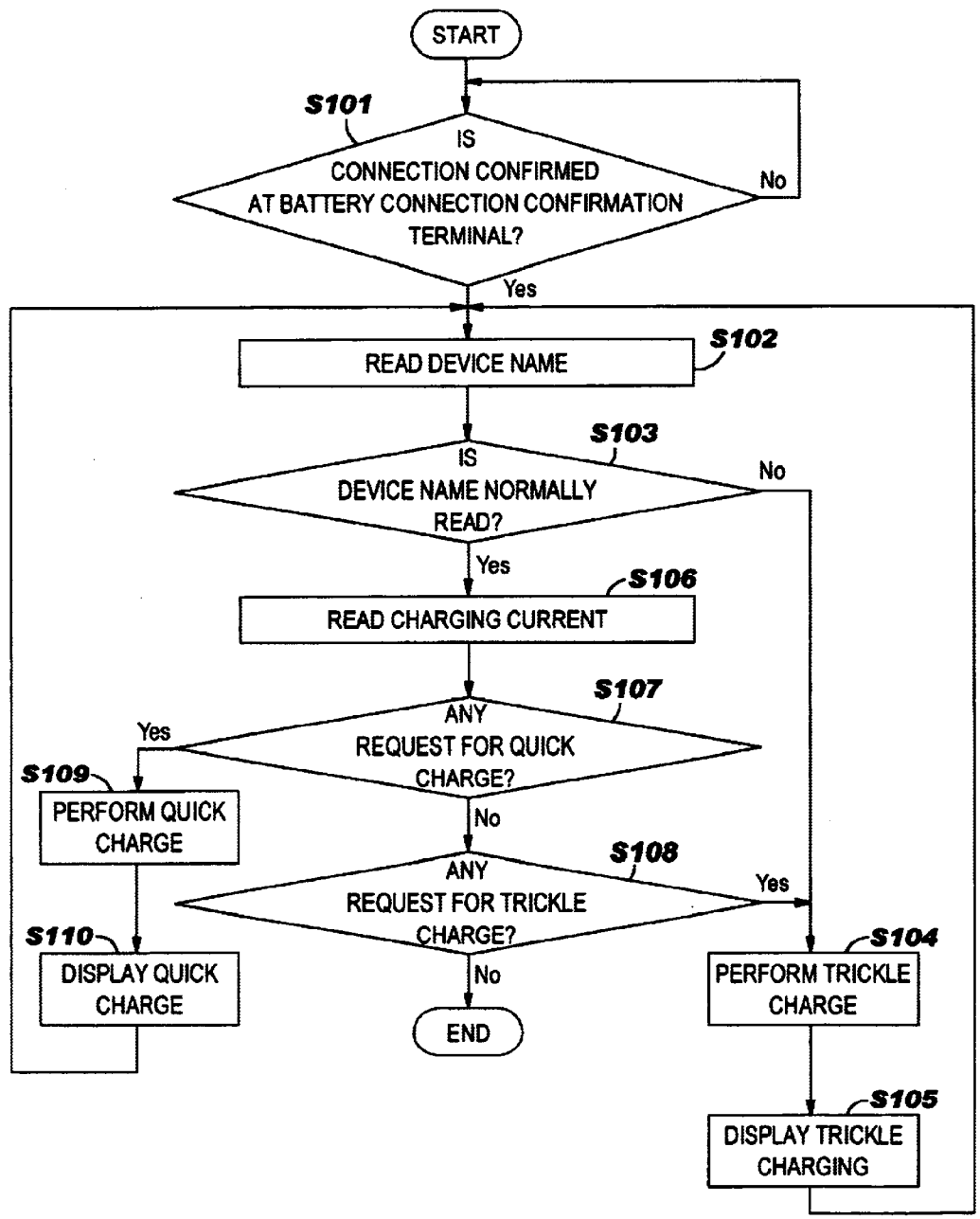
FIG. 3 is a flowchart showing a process for realizing a preliminary charge display function.

FIG. 3 is a flowchart showing a process for realizing the preliminary charge display function. In this process, first of all, it is determined whether or not the battery connection confirmation terminal 76 confirms the connection of the intelligent battery 52, namely, whether or not the battery is connected (step 101). If the connection confirmation is not made, the procedure waits. If the connection confirmation is made, the embedded controller 41 issues an instruction of sending the device name (Device Name) via the communication line 74 to the CPU 62 of the intelligent battery 52, and reads the device name via the communication line 74 (step 102).

Then, it is determined whether or not the device name is normally read (step 103). That is, though the device name is returned in the normal communication, if none is returned and the time-out occurs after the elapse of a specified time, the intelligent battery 52 can be regarded to be in the over discharge state. Thus, if the device name is not normally read at step 103, the embedded controller 41 controls the charger 73 to make the trickle charge (pre-charge) (step 104), and a display of trickle charging is made on the liquid crystal display (LCD) 18 as shown in FIG. 1 (step 105). Thereafter, the procedure returns to step 102.

If the device name is normally read at step 103, the embedded controller 41 issues a command of asking "At which ampere is the battery charged?" via the communication line 74 to the CPU 62 of the intelligent battery 52, and reads the charging current (step 106). Then, it is determined whether or not the read charging current is a request for the quick charge (step 107). If the request for the quick charge is not made, it is determined whether or not the request is for the trickle charge (step 108). If the request is for the trickle charge, the procedure transfers to step 104 to perform the trickle charge, and a display of trickle charging appears (step 105).

At step 107, if the request is for the quick charge, the embedded controller 41 controls the charger 73 to perform the quick charge (step 109). Then, a display of quick charge appears on the liquid crystal display (LCD) 18 (step 110), and the procedure returns to step 102 to read the device name.

Next, a display of preliminary charge will be described below.

The embedded controller 41 recognizes the preliminary charging, if detecting any of the two modes as mentioned above. An indication of preliminary charging is displayed on the LCD provided for the electrical apparatus, or using the utility program for the battery that is executed by the CPU 11. In a case of employing the LCD, yellow light indication signifies the quick charging, yellow flashing indication means the preliminary charging, and no light indication means the charging completion, for example.

Figure 4:
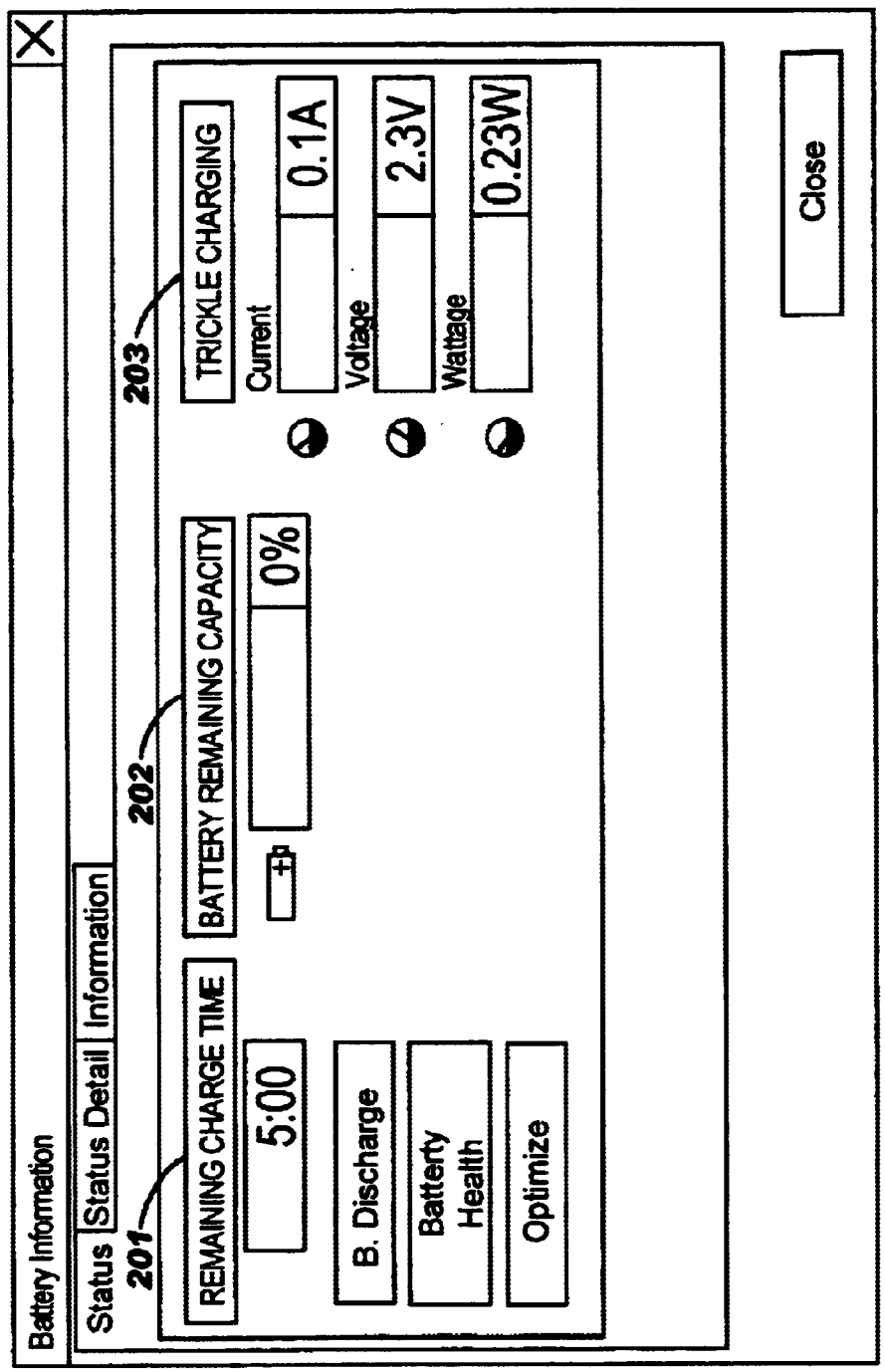
FIG. 4 is a view showing a display example of a preliminary charge (trickle charge) employing the utility program of the battery.

FIG. 4 is a view showing a display example of preliminary charge (trickle charge) employing the utility program of the battery. The utility program acquires the information indicating the preliminary charging from the embedded controller 41, and can display various kinds of information as to the preliminary charging, on the basis of this acquisition. Herein, a remaining charging time display 201, a remaining capacity display 202 and a charging state display 203 are made.

In this example of the remaining charging time display 201 as shown in FIG. 4, the remaining charging time is displayed as "five hours" by adding the normal charging time (about three hours) and the preliminary charging time (two hours). Though the time till the completion of charging can not be usually displayed, the time including the preliminary charging time can be displayed in this embodiment.

In the remaining charging time display 201 having "inclusion" of the preliminary charging time, the normal charging time and the preliminary charging time are displayed in parallel, or the normal charging time and the preliminary charging time are switched for display, or both the times are added and displayed as shown in FIG. 4. In the case where both are displayed in parallel, or switched, it is preferable to show whether the displayed time is the normal charging or the preliminary charging. Of course, the remaining charging time display 201 may be made by combination with the charging state display 203.

Also, in the example of the remaining capacity display 202 as shown in FIG. 4, the remaining capacity of battery is indicated at "0%". The preliminary charging time (two hours) remains at "0%". In the example of the charging state display 203 as shown in FIG. 4, the "trickle charging" display that displays the preliminary charging is effected. And the current value "0.1A", the voltage value "2.3V" and the wattage "0.23W" at present are displayed. With the display of these values, the user can recognize the conditions of the battery being charged. In this charge state display 203, the battery transfers to the normal charge state after the preliminary charging state that is a recovery from the over discharge, whereby the "normal charging" or "quick charging" is displayed. Simply, the "charging" may be displayed.

The display of these values can be effected by the utility program executed by the CPU 11. This utility program is stored in advance in the computer system 10, or may be installed into the computer system 10 from the storage medium such as a CD-ROM or by the communication via the network, and stored in the HDD 31, for example.

As described above in detail, in this embodiment, the preliminary charge is expressly identified, and the user is informed that the battery is in the preliminary charging state.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An electrical apparatus that is capable of accommodating a battery for supplying electric power to a main unit by discharging after charging, comprising:

a preliminary charge judging unit for judging whether or not said battery is in a preliminary charging state that is a recovery from over discharge; and a display unit for displaying an indication of preliminary charging if said preliminary charge judging unit judges that said battery is in the preliminary charging state.

2. The electrical apparatus according to claim 1, wherein said preliminary charge judging unit judges that said battery is in preliminary charging state if a predetermined communication with said battery is disabled after confirming that said battery is connected to said main unit.

3. The electrical apparatus according to claim 1, wherein said preliminary charge judging unit judges that said battery is in the preliminary charging state on the basis of information from a CPU provided in said battery.

4. The electrical apparatus according to claim 1, wherein said display unit displays a remaining charging time including the time required for preliminary charge and the time required for quick recharge that occurs thereafter.

5. An electrical apparatus comprising:

a main unit that consumes an electric power; and a battery for supplying the electric power to said main unit by discharging after charging, wherein said main unit judges that said battery is in a preliminary charging state that is a recovery from over discharge if a predetermined communication with said battery is disabled after confirming that said battery is connected while being charged, and displays the judged result.

6. The electrical apparatus according to claim 5, wherein said main unit measures a battery voltage of said battery, and judges that said battery is in preliminary charging state till said battery voltage reaches a specified voltage at which said battery can start quick charge.

7. A computer that is connectable to a battery for charging and discharging, in which electric power is supplied from said battery connected to a system main unit, wherein said system main unit comprises:

a battery connection confirmation terminal for confirming that said battery is connected;

a controller that judges that said battery is in a preliminary charging state that is a recovery from over discharge if a predetermined communication with said battery is disabled after acquiring the confirmation indicating that said battery is connected from said battery connection confirmation terminal; and a display for displaying that said battery is in preliminary charging state if said controller judges that said battery is in the preliminary charging state.

8. The computer according to claim 7, wherein said system main unit further comprises a voltage measuring circuit for measuring a voltage of said battery, and said controller controls the preliminary charge to be made till said battery voltage reaches a specified voltage at which said battery can start quick charge with said voltage measuring circuit.

9. A computer in which electric power is supplied from a battery for charging and discharging to a system main unit, comprising:

a preliminary charge judging unit for judging whether or not said battery is in a preliminary charging state that is a recovery from over discharge; and a display unit for displaying that said battery is in preliminary charging state if said preliminary charge judging means judges that said battery is in the preliminary charging state.

10. The computer according to claim 9, wherein said preliminary charge judging unit judges that said battery is in preliminary charging state, on the basis of the information acquired via a communication line from a CPU provided in said battery, if the remaining capacity of said battery is less than a predetermined amount and electric current flowing through said battery is in a predetermined range.

11. The computer according to claim 10, wherein said predetermined range is from 0A to 0.5A.

12. A preliminary charging state display method for use with an electrical apparatus that is connectable to a battery for discharging after charging, in which an electric power is supplied from said battery to a main unit, comprising the steps of:

judging whether or not said battery is in a preliminary charging state that is a recovery from over discharge; and displaying an indication of the preliminary charging state if said battery is judged to be in the preliminary charging state.

13. The preliminary charging state display method according to claim 12, further comprising the step of displaying said indication of the preliminary charging state to be distinguishable from quick charge that is the normal charging for said battery.

14. The preliminary charging state display method according to claim 12, further comprising the step of displaying expressly that said battery is in the preliminary charging state on a display provided in said electrical apparatus.

15. The preliminary charging state display method according to claim 12, further comprising the step of displaying the remaining charging time by adding the charging time required for said preliminary charge to the charging time required by quick charge that is normal charge in said battery.

16. A utility program being executed on a computer connectable to a battery for discharging after charging, in which electric power is supplied from said battery to a main unit, comprising:

a function of acquiring the information indicating that said battery is in preliminary charging that is a recovery from over discharge; and a function of displaying that said battery is in preliminary charging state if the information indicating that said battery is in preliminary charging is acquired.

17. The utility program according to claim 16, further comprising a function of displaying the remaining charging time by including the charging time required for the preliminary charge in the charging time required by the normal charge of said battery.

* * * * *